US012097655B2

(12) United States Patent
Mojdeh et al.

(10) Patent No.: US 12,097,655 B2
(45) Date of Patent: *Sep. 24, 2024

(54) HYBRID 3D PRINTING WITH PHOTO-CURABLE MATERIALS

(71) Applicant: Align Technology, Inc., San Jose, CA (US)

(72) Inventors: Mehdi Mojdeh, Fremont, CA (US); Michael Christopher Cole, San Jose, CA (US); Peter Dorfinger, Woodside, CA (US); Shiva P. Sambu, Milpitas, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,437

(22) Filed: Jun. 26, 2023

(65) Prior Publication Data

US 2023/0364855 A1    Nov. 16, 2023

Related U.S. Application Data

(63) Continuation of application No. 17/689,854, filed on Mar. 8, 2022, now Pat. No. 11,718,019, which is a (Continued)

(51) Int. Cl.
*B29C 64/118* (2017.01)
*B29C 64/188* (2017.01)
(Continued)

(52) U.S. Cl.
CPC .......... *B29C 64/118* (2017.08); *B29C 64/188* (2017.08); *B29C 64/209* (2017.08);
(Continued)

(58) Field of Classification Search
CPC ...... B29C 64/264; B29C 64/295; B33Y 30/00
See application file for complete search history.

(56) References Cited

U.S. PATENT DOCUMENTS 5,134,569 A * 7/1992 Masters ................ B29C 64/106
425/162
5,204,124 A * 4/1993 Secretan ............... B29C 64/124
425/150

(Continued)

FOREIGN PATENT DOCUMENTS

WO    2018063816 A1    4/2018

*Primary Examiner* — James Sanders
(74) *Attorney, Agent, or Firm* — Lowenstein Sandler LLP

(57) ABSTRACT

A method of 3D printing comprises extruding one or more photo-curable materials from a nozzle to form a first layer that has a first shape specified by the one or more digital files, wherein the first shape corresponds to a first minimum line width that is based on, and narrower than, a diameter of the nozzle. The method further includes directing a light beam onto the first layer according to the one or more digital files to cure a portion of the first layer to create a first cured layer, wherein the first cured layer corresponds to a second shape of a first layer of a 3D printed orthodontic aligner, wherein the light beam has a beam diameter that is smaller than the diameter of the nozzle, and wherein the second shape has a second minimum line width that is smaller than the first minimum line width.

18 Claims, 6 Drawing Sheets

Related U.S. Application Data continuation of application No. 16/571,029, filed on Sep. 13, 2019, now Pat. No. 11,318,667.

(60) Provisional application No. 62/731,610, filed on Sep. 14, 2018.

(51) Int. Cl.

| | |
|---|---|
| *B29C 64/209* | (2017.01) |
| *B29C 64/232* | (2017.01) |
| *B29C 64/245* | (2017.01) |
| *B29C 64/264* | (2017.01) |
| *B29C 64/295* | (2017.01) |
| *B29C 64/307* | (2017.01) |
| *B33Y 10/00* | (2015.01) |
| *B33Y 30/00* | (2015.01) |
| *B33Y 40/00* | (2020.01) |
| *B33Y 80/00* | (2015.01) |

(52) U.S. Cl.
CPC .......... *B29C 64/232* (2017.08); *B29C 64/245* (2017.08); *B29C 64/264* (2017.08); *B29C 64/295* (2017.08); *B29C 64/307* (2017.08); *B33Y 10/00* (2014.12); *B33Y 30/00* (2014.12); *B33Y 40/00* (2014.12); *B33Y 80/00* (2014.12)

(56) References Cited

U.S. PATENT DOCUMENTS

| | | | |
|---|---|---|---|
| 6,405,095 B1 * | 6/2002 | Jang | B29C 64/165 |
| | | | 264/633 |
| 6,841,116 B2 * | 1/2005 | Schmidt | B33Y 10/00 |
| | | | 425/375 |
| 10,843,452 B2 * | 11/2020 | Wilenski | B29C 64/106 |
| 2010/0140849 A1 * | 6/2010 | Comb | B29C 64/118 |
| | | | 264/401 |
| 2019/0030683 A1 | 1/2019 | Rifaut et al. | |
| 2019/0030687 A1 | 1/2019 | Zanni | |

\* cited by examiner

HYBRID 3D PRINTING WITH PHOTO-CURABLE MATERIALS

RELATED APPLICATIONS

This patent application is a continuation application of U.S. application Ser. No. 17/689,854, filed Mar. 8, 2022, which is a continuation application of U.S. application Ser. No. 16/571,029, filed Sep. 13, 2019, which claims the benefit under 35 U.S.C. § 119(e) of U.S. Provisional Application No. 62/731,610, filed Sep. 14, 2018, each of which are herein incorporated by reference. This patent application is also related to U.S. application Ser. No. 17/689,852 filed Mar. 8, 2022.

TECHNICAL FIELD

The technical field relates to three-dimensional (3D) printing and, in particular, to a hybrid 3D printing technique that uses resin dispensing/extrusion of potentially photo-curable materials and one or more light sources to generate objects with high spatial resolution and/or potentially without support structures.

BACKGROUND

There are multiple types of three-dimensional (3D) printers that fabricate 3D objects through an additive process. Different types of 3D printers can perform different 3D printing techniques, which may in turn depend on different applications. Each type of 3D printing technique may have advantages and disadvantages compared to others.

One example of a 3D printing technique is stereolithography (SLA), also known as optical fabrication solid imaging. In SLA, an object is fabricated by successively printing thin layers of a photo-curable material (e.g., a polymeric resin) on top of one another. For right-side up (also known as top-down) SLA, a platform rests in a bath of a liquid photopolymer (e.g., resin) just below a surface of the bath. A light source (e.g., an ultraviolet laser) traces a pattern over the platform, curing the photopolymer where the light source is directed, to form a layer of an object. The platform is then lowered incrementally, and the light source traces a new pattern over the platform to form another layer of the object at each increment. This process repeats until the object is fabricated. In inverted SLA (upside-down or bottom-up SLA), a portion of a platform begins within a shallow bath of a liquid photopolymer or resin just below a surface of the bath. A light source (e.g., an ultraviolet laser) traces a pattern over the platform from the bottom through a transparent bottom with a non-stick surface, curing the photopolymer where the light source is directed, to form a layer of an object. The platform is raised incrementally, and the light source traces a new pattern over the platform to form another layer of the object at each increment. This process repeats until the object is fabricated.

Another 3D printing technique is digital light processing (DLP). DLP functions in much the same manner as SLA, except that with SLA the light source is generally a laser and with DLP the light source is a DLP projector.

SLA and DLP have high accuracy, and are able to produce objects with fine details. SLA and DLP work with photo-curable materials that have up to a certain viscosity. However, photo-curable materials that have a viscosity that is higher than the maximum viscosity for SLA and DLP cannot be used effectively with SLA or DLP 3D printers. For example, if the viscosity is high (e.g., if the photo-curable material is too viscous), then the uncured material will not fill in over the platform, or will do so too slowly to be commercially viable. For example, resins of low viscosity, e.g., generally about 20-40 mPa-s, are used for SLA and DLP processes.

Additionally, both right-side up SLA and DLP and inverted SLA and DLP systems require the use of support structures for most parts, depending on their design. In right-side up systems, these supports hold parts at a precise location to ensure that all details have something to attach to, and resist lateral pressure from the resin-filled blade. Inverted stereolithography uses supports to attach overhanging parts to the build platform, prevent deflection due to gravity, and retain newly created sections during the peel process. After the object is completed using SLA or DLP, the support structures need to be removed, and the areas at which the support structures were previously located are polished. Regardless of orientation, supports are generally needed to start printing a part and to support any overhanging features. For some objects with complex geometries it can be difficult or impossible to completely remove support structures generated during the SLA or DLP process. This can render such objects unusable for their intended purpose in some situations.

As discussed above, many SLA and DLP techniques are very accurate and that result in fine details. However, SLA and DLP do not work effectively with photo-curable materials that exceed various viscosities. For example, SLA and DLP are generally used with photo-curable materials having viscosities of around 0.35-1.0 Pascal second (Pa-s) at 30° C. (e.g., around 20-40 mPa-s) at processing temperatures. The photo-curable materials used for SLA and DLP are generally composed of carbon chains. The shorter the carbon chain, the less viscous the photo-curable material and the weaker the mechanical properties of the ultimate 3D object manufactured by the SLA or DLP process. Photo-curable materials that have strong mechanical properties often have a viscosity that is too high for use with SLA or DLP (e.g., around 10-100 Pa-s or greater at 30° C.). Some objects (such as orthodontic aligners) may function better if they are manufactured from photo-curable materials with strong mechanical properties. However, dental appliances that have sufficient mechanical properties for clinical use (e.g., to correct malocclusion) have thus far not been manufacturable using SLA or DLP in a manufacturing environment at least in part because printing of such parts using materials exceeding certain viscosities is too slow and/or is not possible. Some of this has been overcome by increasing the temperature of the resin and the vat of resin to decrease its viscosity at the elevated printing temperature. But, this this tends to decrease the pot life of the vat of resin.

Another 3D printing technique is fused deposition modeling (FDM). Traditional FDM printers melt a string of thermoplastic filament and lay the melted string down onto a print bed in a layer-by-layer manner in order to form a 3D object. FDM is a low cost type of 3D printing technique. However, FDM has low accuracy and produces objects that lack fine details.

FDM is often fast, but quite often has low accuracy and cannot produce fine details (e.g., has low clarity and feature resolution). Additionally, the thermoplastics that are used for FDM 3D printing may have mechanical properties that render them unsuitable for certain types of objects such as dental appliances including orthodontic aligners. Accordingly, dental appliances, e.g., orthodontic aligners, that have sufficient mechanical properties for clinical use have also thus far not been manufacturable using FDM.

BRIEF DESCRIPTION OF THE DRAWINGS

The present invention is illustrated by way of example, and not by way of limitation, in the figures of the accompanying drawings, in accordance with some embodiments.

DETAILED DESCRIPTION

Figure 1:
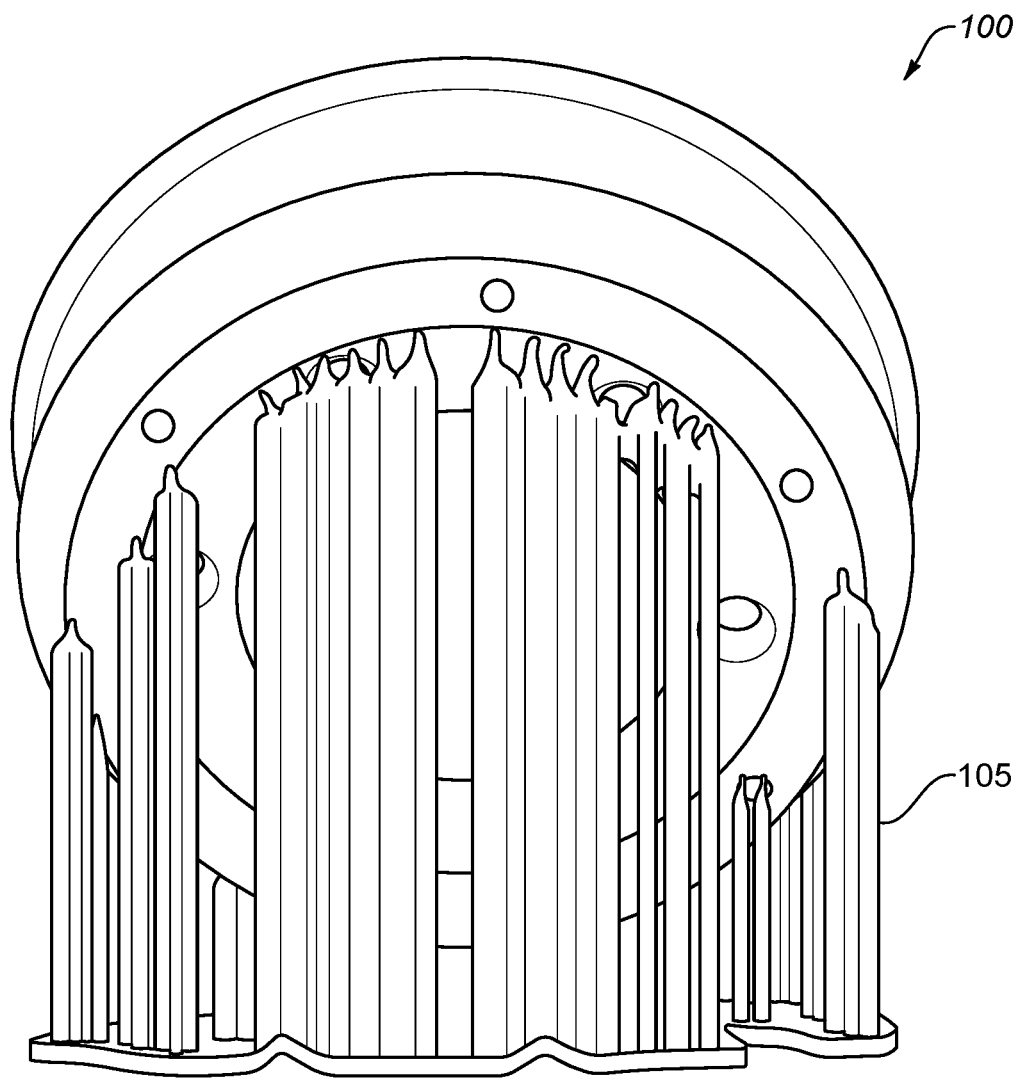
FIG. 1 illustrates an example of a three-dimensional (3D) printed object with support structures.

The embodiments herein relate to methods of three-dimensional (3D) printing, devices used to form objects using methods of 3D printing, and systems incorporating the same. As noted herein, the techniques herein may be used to print various objects. The implementations described herein specify one or more hybrid 3D printing techniques to 3D print an object. Various implementations may include placing a first material that is to form the basis of walls of a vat, and dispensing one or more second materials (e.g., one or more resins and/or photo-curable materials)) within the walls created by the first material. A "photo-curable material," as used herein, may include a material that changes its properties when exposed to radiation, such as light (e.g., light in the ultraviolet or visible regions of the electromagnetic spectrum). These changes may be manifested structurally, for example hardening of the material occurs as a result of cross-linking when exposed to light. A "vat," as used herein, may refer to a formed structure comprising printed walls that define a reservoir configured to contain the one or more second materials.

The one or more second materials may be placed through extrusion or other dispensers. The one or more second materials may be selectively cured portions in a spatially controlled manner. Curing may involve application of light (or other curing radiation) and/or reactive mixing of the resin with one or more other materials. Spatial control of curing may involve limiting application of the curing to form patterns, designs, shapes, etc. to the one or more second materials so that only portions of the one or more second materials are cured. The spatial control may be based on patterns, designs, shapes, etc. derived from a digital file used to define properties of layers of the object to be 3D printed. The operations of placement of the first material, placement of the one or more second materials, and selective curing in a spatially controlled manner may be repeated layer-by-layer until the object is formed.

The hybrid 3D printing techniques described herein may provide similar accuracy and/or resolution (e.g., minimum line width) of SLA and DLP techniques. Additionally, the hybrid 3D printing techniques described in embodiments may provide printing speeds comparable to the printing speed of FDM. In contrast to SLA, DLP and FDM, the hybrid 3D printing techniques described herein may be usable with viscous photo-curable materials (which cannot practicably be used with existing SLA and DLP systems) that are used to form various objects, such as a dental appliance (e.g., a directly fabricated (e.g., 3D printed) dental appliance (e.g., removable aligners (e.g., removable orthodontic aligners) used to implement a treatment plan, dental attachment placement templates, retainers, incremental and/or hybrid palatal expanders, etc.), a mold used to form a dental appliance, etc.

In some embodiments, the techniques herein can be used to form molds, such as thermoforming molds. Examples of these can be found in: U.S. Pat. No. 9,943,991, by inventors Tanugula et al., entitled "Mold with separable features;" U.S. Pat. No. 9,943,386, to inventors Webber et al., entitled "Mold with weakened areas;" and U.S. Pat. No. 8,776,391 to inventors Kaza et al., entitled "System for post-processing orthodontic appliance molds;" as well as any continuation or divisional application claiming priority and any utility or provisional application to which these claim priority therefrom. These patents/applications are hereby incorporated by reference as if set forth fully herein.

In some embodiments, the techniques herein can be used to form appliances with mandibular repositioning features. Examples of these can be found in: U.S. Pat. No. 9,844,424 by inventors Wu et al., entitled, "Dental appliance with repositioning jaw elements;" U.S. Pat. Pub. No. 2015/0238280 by inventors Wu et al., entitled "Dental appliance with repositioning jaw elements;" U.S. Pat. No. 10,213,277 by inventors Webber et al., entitled "Dental appliance binding structure;" as well as any continuation or divisional application claiming priority and any utility or provisional application to which these claim priority therefrom. These patents/applications are hereby incorporated by reference as if set forth fully herein.

In some embodiments, the techniques herein can be used to form palatal expanders. Examples can be found in: U.S. Pat. No. 9,610,141 by inventors Kopelman et al., entitled, "Arch expanding appliance;" U.S. Pat. No. 7,192,273 by inventor McSurdy entitled "System and method for palatal expansion;" U.S. Pat. No. 7,874,836 by inventor McSurdy entitled "System and method for palatal expansion;" as well as any continuation or divisional application claiming priority and any utility or provisional application to which these claim priority therefrom. These patents/applications are hereby incorporated by reference as if set forth fully herein.

In some embodiments, the techniques herein can be used to form attachment formation templates. Examples can be found in: U.S. Pat. Pub. No. 2017/0007368 by inventor Boronkay entitled "Direct fabrication of attachment templates with adhesive;" U.S. Pat. Pub. No. 2017/0165032 by inventors Webber et al., entitled "Dental attachment placement structure;" U.S. Pat. Pub. No. 2017/0319296 by inventors Webber et al., entitled "Dental attachment placement structure;" the contents of U.S. patent application Ser. No. 16/366,686 by inventors Webber et al., entitled "Dental attachment placement structure;" as well as any continuation or divisional application claiming priority and any utility or provisional application to which these claim priority therefrom. These patents/applications are hereby incorporated by reference as if set forth fully herein.

In some embodiments, the techniques herein can be used to form directly fabricated aligners. Examples can be found in: U.S. Pat. App. Pub. No. 2016/0310236 by inventors Kopelman et al., entitled "Direct fabrication of orthodontic appliances with elastics;" U.S. Pat. App. Pub. No. 2017/0007365 to Kopelman et al., entitled "Direct fabrication of aligners with interproximal force coupling;" U.S. Pat. App.

Pub. No. 2017/0007359 to Kopelman et al., entitled "Direct fabrication of orthodontic appliances with variable properties;" U.S. Pat. App. Pub. No. 2017/0007360 to Kopelman et al., entitled "Systems, apparatuses and methods for dental appliances with integrally formed features;" U.S. Pat. No. 10,363,116 to Boronkay entitled "Direct fabrication of power arms;" U.S. Pat. App. Pub. No. 2017/0007366 to Kopeleman et al., entitled "Direct fabrication of aligners for arch expansion;" U.S. Pat. App. Pub. No. 2017/0007367 to Li et al., entitled "Direct fabrication of palate expansion and other application;" as well as any continuation or divisional application claiming priority and any utility or provisional application to which these claim priority therefrom. These patents/applications are hereby incorporated by reference as if set forth fully herein.

Examples of materials that can be used with the embodiments discussed herein include the subject matter of U.S. Pat. Pub. No. 2017/0007362, by inventors Yan CHEN et al., entitled, "Dental Materials Using Thermoset Polymers;" International Patent Application Number PCT/US2019/030683 to ALIGN TECHNOLOGY, INC., entitled "Curable Composition for Use in a High Temperature Lithography-Based Photopolymerization Process and Method of Producing Crosslinked Polymers Therefrom; and International Patent Application Number PCT/US2019/030687 to ALIGN TECHNOLOGY, INC., entitled, "Polymerizable Monomers and Method of Polymerizing the Same." These patents/applications are hereby incorporated by reference as if set forth fully herein. As noted herein, the hybrid 3D printing techniques may combine advantages of SLA, DLP and FDM into a single technology that can be used as the basis of 3D printing objects (dental appliances, hearing aids, medical implants, etc.) for mass production.

In some embodiments, example methods involve one or more of the following operations: (1) Placing a first material that comprises (e.g., forms the basis of) the walls of the vat. (2) If the first material requires photo-curing and/or other treatment, then performing the photo-curing and/or other treatment. (3) Within the walls of the vat, dispensing one or more materials (e.g., one or more second materials) into the vat, for instance, within the walls formed by the first material. The one or more second materials may be cured by light and/or other mechanisms as needed for each material. In some embodiments, at least one of the cure mechanisms is the use of light. In various embodiments, the cure of the one or more materials may be controlled in a spatially resolved manner. Some embodiments may call for use of lasers and/or DLPs to spatially control the curing of the material. (4) If more than one layer is to be made, then the vat wall may be increased in height and the filling of the internal volume of the vat may be performed again, followed by any needed curing of the one or more materials in that layer. (5) As noted herein, in some embodiments, the process may be continued until a full object is printed with its geometry and/or other physical properties. (6) The object may then be removed from the vat and processed by post printing cleaning procedures.

As noted herein, the use of a vat may be optional in some embodiments. For instance, in some embodiments, the vat is not needed (the viscosity of the resin may be high enough to prevent the resin from flowing on the time scale that the printing process occurs, etc.). The resin material may be extruded/dispensed in layers using a Fused Deposition Modeling (FDM) process that include the use of light or other curing mechanism to cure all or part of the extruded resin.

In some embodiments, the vat is provided before the printing process begins. This can be useful for objects that are not very tall in height and/or have the same or approximately the same shape each print.

In some embodiments, the vat material is one of the materials used to make the printed object.

In some embodiments, one or more of the materials are hot melt materials such as those typically used in FDM style 3D printing.

In some of the embodiments, one or more of the materials are thermosetting materials. Examples of thermosetting materials are further discussed herein.

In some embodiments, 2 or more materials are mixed during dispensing such as with a static mixer. Such materials may react with each other to form a new material. Some non-limiting examples of materials that can be made and reactions that can be used are urethanes, amine-epoxies, Michael additions, Epoxies, Ring opening reactions/polymerizations, vulcanization, silane and siloxane materials, dielalders reactions, ROMP reactions, etc. It is also possible to use the mixing of two materials during dispensing to incorporate either non reacting materials or reactive materials such as pigments, dyes, flavors, fragrances, drugs, fillers, solvents, plasticizers, catalysts, initiators, etc.

In some embodiments, the material may be destroyed, trimmed, burned, or other otherwise removed within one or more layers such as by mechanical means such as dremels, milling, sanding, gouging, die cutting, etc. and/or by optical means such as laser cutting and/or other ablation techniques and/or physical techniques such as boiling, subliming, or sucking material.

In some embodiments, a material or object may be introduced by placing the material into a cavity created by removing material from one or more layers. Such introduced materials/objects may be place into a hole created via subtractive mechanisms such as described above or may push material in the layer(s) out of the way (easiest if a liquid) or simply placed on top of the uppermost layer. Further layer creation can occur on top of and/or around the introduced material/object. Some non-limiting example objects and/or materials are ECIs or other electronic devices, mechanical supports such as metal wires, or plastic sheets, fibers, glass, ceramics, metal sheets, sensors, indicators, etc. Pick and place technologies are useful for introducing various objects into the printed object during the printing process. Robotic arms of various types can be designed to perform needed placement of objects/materials.

The device can use small needles or tubes for extruding/dispensing material(s) onto the substrate or layer. Additionally, this device may use jetting technology such as Nordson EFD's PICO Pμlse and/or use of micro extrusion such as the TWW Micro Extruder and/or micro dispensing systems such as Vermes Micro Dispensing System—MDS 3280. In general, the device is able to deliver high and/or low viscosity materials to the print area. Additionally, the device has the option of having more than one material delivery head and/or more than one delivery method. All these methods are scalable, and though they are currently listed in the micro liter range, higher and smaller scale dispensers could be used depending on the needed resolution and desired speed of the final printed object.

Once material is delivered to the print area, some or all of it is cured in a spatially controlled manner such as by light and/or reactive mixing and dispensing. Each layer is created by delivering more material in a controlled manner to the vat.

The laser and/or projection system are typically focused onto the upper layer surface or just barely into the top layer surface. Addition of layers requires that the focal points of the light source to be adjusted. The focal points of the light source can be controlled by optically sensing the location of the surface (such as performed in an Octave 3D printer) or various forms of machine vision (to name two non-limiting examples) and adjusting the optical system and/or the vat height to keep the focus in the right location. Another potential method is to adjust the vat height based on the amount of material dispensed. The light source can be adjusted or the height of the vat can be adjusted to account for the height of the new layer by calculations based on the known or measured or calculated volume of the vat and the amount of material delivered (devices or sensors to measure the amount of material delivered is useful for this embodiment). Mechanical floats, hall sensors, temperature sensors, and other mechanical and electrical sensors can also be used to determine the location of the surface of the layer. Optical methods are most preferred. The process of adding material to the print area and curing is repeated until a printed object is complete.

Pick and place operations can occur at any stage of the print process and may include removing objects.

One feature is the ability to quickly deliver large amounts of one or more materials to the print area in time frames that make the whole process of printing a well resolved object possible in a reasonable time frame such that mass manufacturing can be cost effective. Currently, ink jets can make multi material objects similar to the device described herein, but the time required to print is very long. SLA and DLP printers are not effective at printing multi materials objects, unlike the embodiments described herein. Time frames that are useful for printing aligners and/or medical devices in a manufacturing or doctor's office environments are 10 seconds to 1 min per device, 1 min to 5 minutes per device, 5 minutes to 10 minutes per device, 10 to 30 minutes per device, 30 minutes to 2 hours per device, and 2 hours to 6 hours per device. Shorter times are generally more desirable.

In some embodiments, the material is heated prior and/or during dispensing to facilitate flow of the material out of the dispenser. In a few embodiments, it is useful to cool a material before dispensing. For example, a super-cooled solution (such as water as an example) can be dispensed from the head at which time it instantly freezes. This can be used as vat materials or supports in some embodiments.

Resolution

The resolution of the final part is controlled by the size of the delivery method and the resolution of the curing mechanism. In one main embodiment, the material is delivered in microliter (or pico liter) quantities and cured using a light source such a DLP. Typical resolutions of DLP are 30×30 microns in the x/y plane up to 100×100 microns. Other ranges are also possible depending on the needs required by the print. Lasers can provide focal points downs to 10 microns (or less), but typically range from 30 to 100 microns. Holographic projectors such as those being created by Pacific Light and Hologram are also useful in various embodiments as a curing source.

The z dimensional resolution may be controlled by the amount of light absorber in the resin when light curing is used. It may also be controlled by the amount of resin delivered to the print area. For instance, once the vat wall is present, the volume of resin per layer can be calculated and accurately delivered. This can easily control the layer height. Optionally, an optical or other sensing method (such as weight) can be used to determine the height of the layer in a feedback system. It is expected that layer heights can range from 1 micron to 50 microns and/or greater than 100 microns. Each layer height can be controlled independently to other layers. Layer height is also a function of the scale of the object to be printed combined with the desired z dimensional resolution. Printing of large scale objects that are 10s of centimeters in height may use a z dimensional layer spacing of 1 mm or even 1 cm. Such scaling options are anticipated.

Resolution of the composite material components of the printed object is either controlled by x/y resolution of the curing mechanism and/or by the z dimensional height control. This is true when each layer is a different material (for example is layer one if material A and layer 2 is material B and subsequent layers alternate between A and B).

When each layer comprises more than one material, then the composite dimensions are controlled by the above factors in addition to where the spatial curing is taking place. For instance, if two or more dispensing heads are dispensing two different materials side by side and each liquid is 100 microns wide, a cure system of 100 microns width can create a 50 micron wide material A connected to a 50 micron wide material B. Alternatively, a cure system curing a 50 micron width line might create two (or more) strips of 50 micron wide strips of material A and Material B, which may not be connected together at that location. However, the two materials may be present in the same layer. Thus, the resolution of the materials that comprise the composite has multiple possibilities when using the embodiments described herein.

In some embodiments that use multiple materials, the different materials are fed through a series of channels or tubes into a single dispensing or extruding tube. In such an embodiment, the different materials are metered or delivered into the single tube and dispensed as needed. It may be useful to purge any remaining material before delivering a new material and such purging of material may be done outside the vat, into a separate vat, or into areas within the vat that are not part of the object being printed. Mixing of two or more materials may also be done with such a set up and depending on the viscosities and flow properties of the materials and the channel diameters, laminar flow can prevent the materials from mixing thus allowing the two or more materials to be dispensed as an unmixed combination of materials after which it can be cured in that state and thus preserve the unmixed structure.

In some embodiments, the one or more dispensing heads are able to deliver material at the same time other heads are dispensing material. Such configurations allow for fast layer creation with one or more materials in each layer.

In many embodiments, material placement is controlled by a computer which controls the heads such that material is placed in locations as determined by an input file and then a computer controls where the materials are to be cured as determined by an input file.

Though the terms tubes and needles have been used to describe the output from a dispensing head, other shapes are contemplated. Some non-limiting examples are ribbons, rectangles, ovals, stars, or other shapes.

In embodiments that use a vat, the material delivery heads may need to be retractable or height adjustable so as to be able to traverse over the vat wall in order to dispense inside the vat. This is especially true if there are more than 1 material delivery heads. This can also be accomplished by moving the vat up and down, though this is less preferred. A computer can be used to determine the best way and/or height of retraction of the print heads during printing in order to avoid hitting or contacting the vat.

Light Source

One or more lasers can be used to cure the resins that are supplied to the print area. The lasers can be used in a scanning configuration, common in the SLA industry, and or in other configurations such as flash. Lasers can also be used to create interference patterns that may be useful in certain applications. A DLP device can also be used as is standard in the 3D printing industry. Other methods of curing such as E beam, x ray, other forms of radiation, multiphoton, and/or heat (infrared) can be used independently or combined with each other. Holographic projectors and/or laser interference are also useful in some embodiments described herein.

Vat Material Descriptions

The material used to make the vat can be comprised of thermosets and/or thermoplastic materials. They can be delivered by any of the listed delivery methods and if curing is needed, any curing method can be used.

It is preferred that the material be thixotropic such that as the material is delivered it does not change its shape too much or flow away (or it needs to be cured before it can flow away).

The vat layer may be level with the fill level of the vat. Alternatively, in some embodiments, the vat is created one layer ahead of the fill level represented by the current layer of the printed object in the vat.

In some embodiments, the hybrid 3D printing techniques described herein include heating a highly viscous photo-curable material to reduce the photo-material's viscosity, and then extruding the photo-curable material from a nozzle to form layers of an object according to a digital file. A first layer of the object may have a first shape specified by the digital file. The first shape may have a first minimum line width based on a diameter of the nozzle. The new hybrid 3D printing technique further includes directing a light beam onto the layers of the object as they are deposited (or after they are deposited) according to the digital file or an additional digital file to cure a portion of each of the layers. The cured portion of the first layer may have a second shape within the first shape. The light beam used to cure the portion of the layers may have a beam diameter that is smaller than the diameter of the nozzle. Accordingly, the light beam may be used to produce details that are much finer than those that can be produced simply by extruding material from the nozzle. As such, the second shape may have a second minimum line width that is smaller than the first minimum line width. Extrusion in this disclosure can encompass various material delivery methods comprising jetting technology such as Nordson EFD's PICO Pµlse and/or use of micro extrusion such as the TWW Micro Extruder and/or micro dispensing systems such as dispensers such as Vermes Micro Dispensing System—MDS 3280. Larger or smaller formats that scale depending on the needed resolution of the printed part are also possible.

Existing 3D printing technologies, including FDM, SLA and DLP, all utilize support structures to support 3D printed objects during the printing process. FIG. 1 illustrates an example printed 3D object 100 with support structures 105. Support structures 105 are undesirable, as they ultimately will not be part of the object 100. However, such support structures 105 generally need to be added during the printing process to ensure that the object has a desired shape. For SLA and DLP, for example, the support structures 105 may hold the object at a precise location to ensure that all details of the object have something to attach to and/or to resist lateral pressure from a resin-filled blade, may attach the overhanging object 100 to a platform, may prevent deflection due to gravity, and/or may retain newly created sections during a peel process.

The hybrid 3D printing technique described in some embodiments uses a photo-curable material that is highly viscous at room temperature. For example, in embodiments the photo-curable material may become solid or nearly solid at room temperature. Portions of the deposited photo-curable material are exposed to a light beam with a narrower diameter than a diameter of the nozzle used to deposit the photo-curable material. This enables objects to be built without support structures and/or with reduced support structures since the photo-cured sections of the printed 3D object are encapsulated and supported by the uncured but frozen portions of the photo-curable material.

Figure 2:
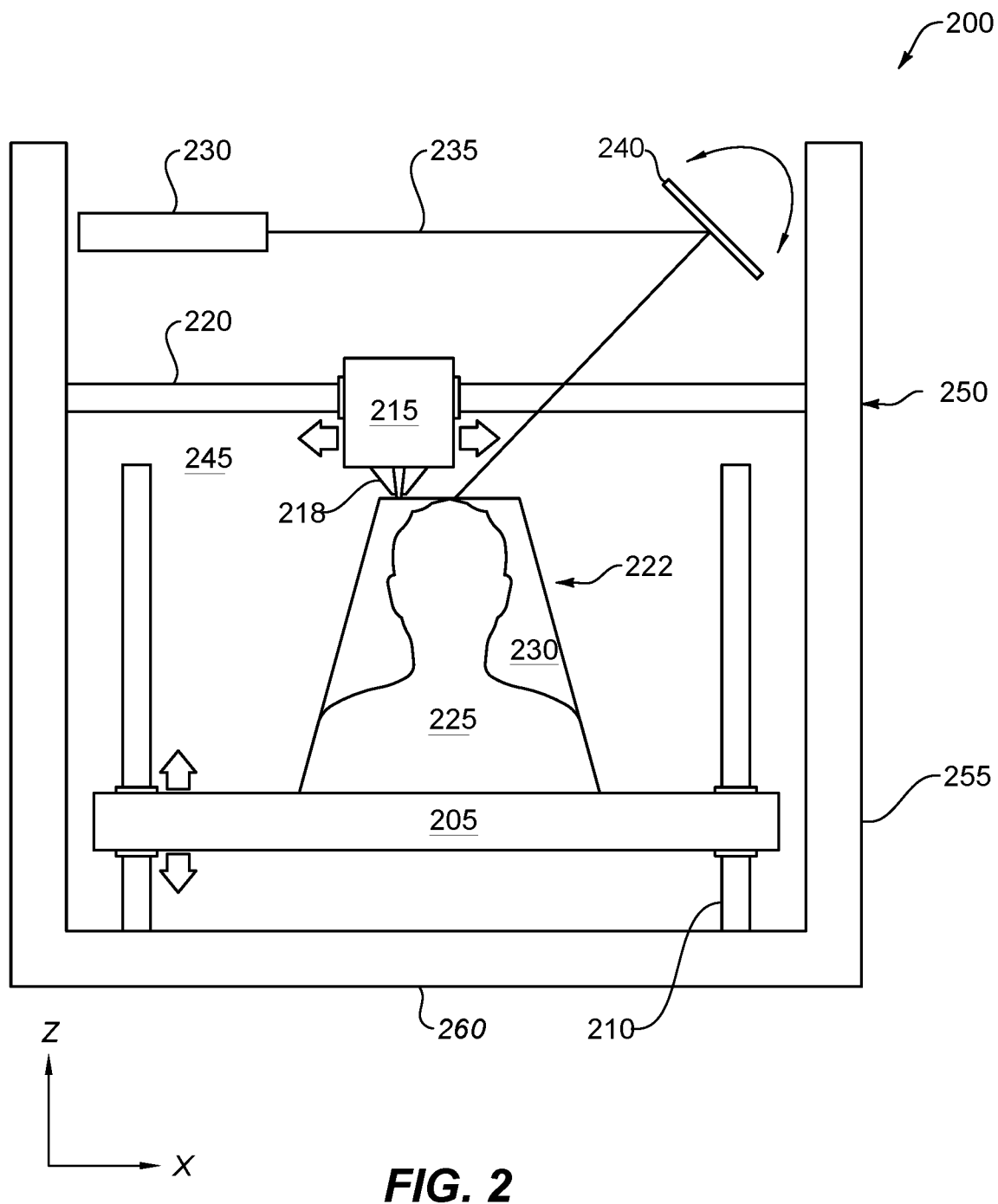
FIG. 2 illustrates a hybrid 3D printer, in accordance with some embodiments.

FIG. 2 illustrates a sectional view of a hybrid 3D printer 200, in accordance with some embodiments. The hybrid 3D printer 200 may be used with photo-curable materials that, when cured, have desirable mechanical properties such as high tensile strength, high elongation at break, high elongation at yield, high modulus of elasticity, high flexural strength, high creep resistance, low stress at relaxation and/or high flexural modulus. The hybrid 3D printer 200 may also be used to manufacture objects with complex geometries without the use of support structures or with minimal use of support structures. The hybrid 3D printer 200 may be used, for example, to directly manufacture orthodontic aligners used to correct malocclusion and/or to construct other dental appliances. It can also be used to print composite structures.

In some embodiments, the hybrid 3D printer 200 includes a chamber body 250 that encloses an interior volume 245. The chamber body 250 may be fabricated from aluminum, stainless steel, plastic, ceramic and/or other suitable material. The chamber body 250 generally includes sidewalls 255 and a bottom 260. In alternative embodiments, the chamber body 250 may be omitted.

Enclosed within the interior volume 245 of the chamber body 250 is a platform (also known as a print bed) 205 to support a printed object 222. The platform 205 may include a stepper motor that can move the platform 205 along a vertical guideway (e.g., a set of vertical guide rods) 210 in the z direction according to instructions from a controller. Alternatively, the stepper motor may be separated from the platform 205, but may still drive the platform 205 along the vertical guideway 210.

Also enclosed within the interior volume 245 of the chamber body 250 is a guideway 220 onto which a dispenser (also known as an extruder) 215 is mounted. The dispenser 215 may include one or more stepper motors that can move the dispenser 215 along the guideway 220 and precisely control the position of the dispenser 215 in the xy plane. Alternatively, the stepper motor(s) may be separated from the dispenser 215, but may still move the dispenser 215 in at least the xy plane.

In some embodiments, the dispenser 215 is mounted to a mechanical stage that is movable in at least the xy plane. In such embodiments, the one or more stepper motors may be included in the mechanical stage. In some embodiments, a light source that emits a light beam that is usable to cure the photo-curable material is also mounted to the mechanical stage. For example, the dispenser 215 may be mounted to the mechanical stage at a first position and the light source may be mounted to the mechanical stage at a second position. The light source mounted to the mechanical stage may be rotatable or otherwise movable to direct the light beam to a target location regardless of a position of the mechanical stage within the interior volume 245 in embodiments.

In some embodiments, the dispenser 215 (and/or mechanical stage) is also movable along the z-axis. For example, in the illustrated embodiment the dispenser 215 moves in the xy plane and the platform 205 moves along the z axis (which may be the axis that is normal to a plane defined by the platform). However, in some embodiments the platform 205 may be stationary and the dispenser 215 may be movable along the x-axis, the y-axis and the z-axis.

The dispenser 215 may include a container that holds a viscous photo-curable material. The dispenser 215 may additionally include one or more heating element to heat at least a portion of the viscous photo-curable material, a nozzle 218 to extrude the heated photo-curable material, and/or a feeder to feed the heated photo-curable through the nozzle 218. The feeder may be a pump, a piston, a screw mechanism, or other mechanism that applies a force to extrude the heated photo-curable material through the nozzle 218.

Though only a single dispenser 215 is shown, in embodiments the 3D printer 200 may include multiple dispensers (e.g., two or more dispensers), each of which may be moved independently and which may operate in parallel to speed up the deposition of the photo-curable material onto the platform 205. Additionally, more than one photo-curable material may be provided by one or more dispensers.

The photo-curable material provides for a relatively high glass transition temperature and a decreased rigidity and increased toughness of polymerizates, i.e. high values of tensile modulus, tensile strength at yield, elongation at break and stress relaxation in embodiments.

The photo-curable material may include materials such as a polyester, a co-polyester, a polycarbonate, a polypropylene, a polyethylene, a polypropylene and polyethylene copolymer, a polyurethane, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a dendritic acrylate, a polyester urethane acrylate, a multifunctional acrylate, a polybutadiene urethane acrylate, a polyester urethane methacrylate, an aliphatic polyester urethane methacrylate (e.g., such as a BOMAR XR-741 MS), an aliphatic difunctional acrylate (e.g., such as Miramer UA5216), a polyether acrylate, an acrylic polyester acrylate, a polyester acrylate, an acrylic acrylate, a polyether urethane methacrylate, a silicone urethane acrylate, or combinations thereof. The photo-curable material may additionally include other materials in addition to, or instead of, the above mentioned materials. The photo-curable material can be provided in an uncured form (e.g., as a liquid, resin, etc.) and can be cured (e.g., by photopolymerization, light curing, laser curing, crosslinking, etc.). The properties of the material before curing may differ from the properties of the material after curing. Once cured, the materials herein can exhibit sufficient strength, stiffness, durability, biocompatibility, etc. for use in an aligner. The post-curing properties of the materials used can be selected according to the desired properties for the 3D printed object.

The photo-curable material may be a highly viscous resin formulation that includes one or more components. The components may include one or more polymerizable species (such as those mentioned above), one or more polymerizable monomers that may be used as reactive diluents, polymerization initiators, polymerization inhibitors, solvents, fillers, antioxidants, pigments, colorants, surface modifiers, glass transition temperature modifiers, toughness modifiers, and/or mixtures thereof. In order for the photo-curable material to ultimately produce a cured polymer (e.g., a cross-linked polymer) with sufficient mechanical properties to use for applications such as orthodontic aligners, the photo-curable material may include long chain monomers. The inclusion of such long chain monomers in the photo-curable material results in a high viscosity (e.g., such as a material that behaves as a solid at room temperature).

In some embodiments, polymerizable monomers included in the photo-curable material as a reactive diluent may have low melting points (e.g., of less than 90° C., less than 50° C., or even less than 30° C., which would result in the polymerizable monomer being liquid at room temperature) and substantially low volatility (e.g., a mass loss of <1 wt % at temperatures of up to 90-120° C.). In some embodiments, the polymerizable monomers are selected from the group consisting of the following compounds:

2-isopropyl-5-methylcyclohexyl 2-(methacryloxy)benzoate (1);

3,3,5-trimethylcyclohexyl 2-(methacryloxy)benzoate (2);

1,3,3-trimethyl-2-bicyclo[2.2.1]heptanyl 2-(methacryloxy)benzoate (3);

1,7,7-trimethyl-2-bicyclo[2.2.1]heptanyl 2-(methacryloxy)benzoate (4);

3,3,5-trimethylcyclohexyl 3-(methacryloxy)benzoate (5);

3,3,5-trimethylcyclohexyl 4-(methacryloxy)benzoate (6); and 3,3,5-trimethylcyclohexyl 2-(acryloxy)benzoate (7).

Other possible reactive diluents that may be used include acrylates and methacrylates such as such as (poly)glycol di(meth)acrylates, e.g. tri- or tetraethylene glycol dimethacrylate (TEGDMA), bisphenol A dimethacrylate or the hydrogenated form thereof, 4,4'-isopropylidenedicyclohexanol di methacrylate, or salicylic ester (meth)acrylates; (poly) vinyl monomers, e.g. vinyl acetate, styrene, divinylbenzene. Some examples diluents are TEGDMA and salicylic ester (meth)acrylates such as cycloalkyl salicylate (meth)acrylates.

The photo-curable material extruded by the dispenser 215 may be a highly viscous resin. The photo-curable material may have a viscosity of greater than 100 Poiseuille (Pa-s) (e.g., a viscosity of 300 Pa-s or more) at room temperature and a viscosity of below 70 Pa-s (e.g., 0.3 Pa-s, 1 Pa-s, 5 Pa-s, 10 Pa-s, 20 Pa-s, 30 Pa-s, 40 Pa-s, 50 Pa-s, 60 Pa-s, etc.) at processing temperatures at or above 50° C. (e.g. in the range from 90° C. to 130° C.) in some embodiments. In further embodiments, the photo-curable material may have a viscosity of under 2 Pa-s (e.g., around 1-2 Pa-s) at the processing temperatures and may have a viscosity of over 10 Pa-s (e.g., around 10-300 Pa-s) at room temperature. The dynamic viscosity of a fluid indicates its resistance to shearing flows. The SI unit for dynamic viscosity is the Poiseuille (Pa-s). Dynamic viscosity is commonly given in units of centipoise, where 1 centipoise (cP) is equivalent to 1 mPa-s. In some embodiments, the photo-curable material has a viscosity as set forth in the below table. The presence of the reactive diluent(s) (e.g., the polymerizable monomers) may provide for a viscosity of the photo-curable material of less than 70 Pa-s at the processing temperatures, even though the composition (without the reactive diluent(s)) may have a viscosity as high as 300 Pa-s or more, or may even be solid, at room temperature in some embodiments.

TABLE 1

Viscosities at varying temperatures

| Example Resin | n at 25° C. [Pa-s] | n at 50° C. [Pa-s] | n at 70° C. [Pa-s] | n at 90° C. [Pa-s] |
|---|---|---|---|---|
| BOMAR XR-741 MS + polymerizable monomer | 1,250 | 16.2 | 1.6 | 0.3 |
| Miramer UA5216 + polymerizable monomer | 734 | 78.7 | 20.0 | 6.7 |

In some embodiments, the photo-curable material including one or more polymerizable species and at least one photopolymerization initiator may be heated to an elevated process temperature (e.g., 60-130° C., 90-120° C., etc.) before becoming irradiated with light of a suitable wavelength (e.g., UV light) to be absorbed by said photoinitiator, thereby causing a cleavage of the photoinitiator to induce polymerization of the one or more polymerizable species to obtain a crosslinked polymer. If the photo-curable material includes one or more polymerizable monomers, the polymerizable monomers may become co-polymerized in the polymerization process, resulting in an optionally crosslinked polymer comprising moieties of the polymerizable monomer as repeating units.

As used herein, the term "polymer" refers to a molecule composed of repeating structural units connected by covalent chemical bonds and characterized by a substantial number of repeating units (e.g., equal to or greater than 10 repeating units and often equal to or greater than 50 repeating units and often equal to or greater than 100 repeating units) and a high molecular weight (e.g. greater than or equal to 5,000 Da, 10,000 Da or 20,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, alternating, segmented, grafted, tapered and other copolymers. "Crosslinked polymers" refers to polymers having one or multiple links between at least two polymer chains, which may result from multivalent monomers forming crosslinking sites upon polymerization.

Photopolymerization occurs when suitable formulations are exposed to light of sufficient power and of a wavelength capable of initiating polymerization. The wavelengths and power of light useful to initiate polymerization of the photo-curable material depends on the initiator used. Light as used herein includes any wavelength and power capable of initiating polymerization. Preferred wavelengths of light include ultraviolet (UV) or visible. UV light sources include UVA (wavelength about 400 nm to about 320 nm), UVB (about 320 nm to about 290 nm) or UVC (about 290 nm to about 100 nm). Any suitable light source may be used, including laser sources. The light source may be broadband or narrowband, or a combination thereof. The light source may provide continuous or pulsed light. Both the length of time the system is exposed to UV light and the intensity of the UV light can be varied to determine the ideal reaction conditions.

In some embodiments, the materials that comprise the final printed object are biocompatible and bioinert materials. "Biocompatible," as used herein, may refer to a material that does not elicit an immunological rejection or detrimental effect, referred herein as an adverse immune response, when it is disposed within an in-vivo biological environment. For example, in embodiments a biological marker indicative of an immune response changes less than 10%, or less than 20%, or less than 25%, or less than 40%, or less than 50% from a baseline value when a human or animal is exposed to or in contact with the biocompatible material. Alternatively, immune response may be determined histologically, wherein localized immune response is assessed by visually assessing markers, including immune cells or markers that are involved in the immune response pathway, in and adjacent to the material. In an aspect, a biocompatible material or device does not observably change immune response as determined histologically. In some embodiments, the photo-curable material is used to manufacture biocompatible devices configured for long-term use, such as on the order of weeks to months, without invoking an adverse immune response. Biological effects may be initially evaluated by measurement of cytotoxicity, sensitization, irritation and intracutaneous reactivity, acute systemic toxicity, pyrogenicity, subacute/subchronic toxicity and/or implantation. Biological tests for supplemental evaluation include testing for chronic toxicity.

"Bioinert," as used herein, can refer to a material that does not elicit an immune response from a human or animal when it is disposed within an in-vivo biological environment. For example, a biological marker indicative of an immune response remains substantially constant (plus or minus 5% of a baseline value) when a human or animal is exposed to or in contact with the bioinert material. In some embodiments herein, bioinert devices are provided.

After exposure to light, the photo-curable material may become cured, and may at that point include crosslinked polymers. In some embodiments, the crosslinked polymers are characterized by a tensile stress-strain curve that displays a yield point after which the test specimen continues to elongate, but there is no increase in load. Such yield point behavior typically occurs "near" the glass transition temperature, where the material is between the glassy and rubbery regimes and may be characterized as having viscoelastic behavior. In some embodiments, viscoelastic behavior is observed in the temperature range 20° C. to 40° C. The yield stress is determined at the yield point. In some embodiments, the modulus is determined from the initial slope of the stress-strain curve or as the secant modulus at 1% strain (e.g. when there is no linear portion of the stress-strain curve). The elongation at yield is determined from the strain at the yield point. When the yield point occurs at a maximum in the stress, the ultimate tensile strength is less than the yield strength. For a tensile test specimen, the strain is defined by $\ln(I/I_0)$, which may be approximated by $(I-I_0)/I_0$ at small strains (e.g. less than approximately 10%) and the elongation is $I/I_0$, where I is the gauge length after some deformation has occurred and $I_0$ is the initial gauge length. The mechanical properties can depend on the temperature at which they are measured. The test temperature may be below the expected use temperature for a dental appliance such as 35° C. to 40° C.

In some embodiments, the one or more of the materials has a glass transition temperature (Tg) of over 70° C. or of over 100° C., which prevents the polymers from softening, thus contributing to the dimensional stability and accuracy of shape of the cured products. The presence of oligomeric, i.e. relatively low-molecular-weight of about 0.4 to 5 kDa, glass transition temperature modifier(s) may provide for the relatively high glass transition temperature.

The one or more materials may additionally have a decreased rigidity and increased toughness and flexibility, as expressed by a tensile modulus of about 800-1,000 MPa, a tensile strength at yield of about 25-40 MPa, an elongation at break of about 20-30%, a stress relaxation of about 20-35% of the initial load, and/or a stress relaxation of 2-3 MPa after 2 hours, when examined under test conditions of a temperature of 37±2° C. at 100% relative humidity or a temperature of 37±2° C. in water, i.e. at about body temperature. In some embodiments, the one or more materials has one or more of the following properties: a tensile modulus greater than or equal to 800 MPa, an elongation at break greater than or equal to 20%, a stress remaining after 2 h of greater than or equal to 20% of the initial load, and/or a glass transition temperature of greater than or equal to 80° C. In further embodiments, the material (e.g., crosslinked polymer) has one or more of the following properties: a tensile modulus greater than or equal to 1,000 MPa, an elongation at break greater than or equal to 30%, a stress remaining after 2 h of greater than or equal to 35% of the initial load, and/or a glass transition temperature of greater than or equal to 90° C. In some embodiments, the material has a glass transition temperature (Tg) of about 100 to about 120° C. In some embodiments, the material has a storage moduli at 20° C. of about 2000 MPa to about 2800 GPa. In some embodiments, the material reaches a storage moduli of 1000 MPa at about 60-120° C. At least some of the above mechanical properties may be enabled by the presence of polymeric, i.e. high-molecular-weight (>5 kDa), toughness modifier(s) in embodiments.

Other materials (resins, formulations, monomers, polymers, oligomers, etc.) and/or methods that can be used by the techniques described herein include the subject matter of U.S. Pat. Pub. No. 2017/0007362, to Yan CHEN et al., entitled, "Dental Materials Using Thermoset Polymers;" International Patent Application Number PCT/US2019/030683 to ALIGN TECHNOLOGY, INC., entitled "Curable Composition for Use in a High Temperature Lithography-Based Photopolymerization Process and Method of Producing Crosslinked Polymers Therefrom; and International Patent Application Number PCT/US2019/030687 to ALIGN TECHNOLOGY, INC., entitled, "Polymerizable Monomers and Method of Polymerizing the Same." The subject matter of these applications and all other patents and patent publications listed in this disclosure are hereby incorporated by reference as if set forth fully herein.

The hybrid 3D printer 200 may additionally include a light source 230 that generates a light beam 235 that is precisely directed onto portions of the 3D object 222. Some portions of the object 222 are exposed to the light beam 235, and become cured portions 225. Other portions of the object 222 are not exposed to the light beam 235, and remain uncured portions 230. As shown, the uncured portions 230 may have a first shape and the cured portions 225 may have a second shape that is encapsulated within the first shape.

The hybrid 3D printer 200 may additionally include a controller (not shown) that controls the position and movements of the dispenser 215, the platform 205 and/or the light source 230. The controller may send instructions to stepper motors for the dispenser 215 and/or platform 205 according to a digital file such as a digital file having a stereolithography (STL) file format, an OBJ file format, an Filmbox (FBX) file format, a COLLADA file format, a 3DS file format, an Initial Graphics Exchange Specification (IGES) file format, a STEP file format, or other 3D file format to achieve computer aided manufacturing (CAM). Through the coordinated movement of the platform 205 and/or dispenser 215, a 3D object 222 may be created by printing one layer of the 3D object 222 at a time.

In some embodiments, the light source 230 is a laser such as an ultraviolet (UV) laser. In various embodiments, the light source 230 has a fixed position, and directs the light beam 235 onto a scanning mirror 240 (e.g., such as an x-y scanning mirror). The scanning mirror 240 may then be controlled by the controller to direct the light beam to a target location in the xy plane. The scanning mirror 240 moves the light beam in a pattern across the uppermost layer of the object 222 according to the digital file to cure some portions of the uppermost layer and optionally one or more lower layers of the object 222. In an alternative embodiment, the light source 230 itself may be movable (e.g., rotatable) to direct the light beam to target locations within the interior volume 245. In another embodiment, the light source 230 may be attached to the dispenser 215 (e.g., to a nozzle of the dispenser). For example, they light source 230 may have a fixed position that directs the light beam to a fixed point below the nozzle of the dispenser 215. Alternatively, the light source 230 may be attached to the dispenser 215, but may be movable (e.g., rotatable) to adjust where the light beam is directed. The laser may scan the uppermost layer of the object 222 according to the digital file to cure portions of the object in embodiments.

In some embodiments, the light source 230 is a high-definition DLP projector (e.g., which may emit UV light beams). The DLP projector can emit light onto multiple locations of the platform 205 and/or object 222 simultaneously. The DLP projector may divide the area under the DLP projector into a grid of pixels, and the DLP projector may control for each pixel whether that pixel is exposed to light. Additionally, each pixel of the projector can be output in a spectrum from white to gray to black. This enables each pixel location to be cured to a different depth. Accordingly, the object 222 may be divided into voxels, and the amount of light exposure to each voxel may be controlled.

Though only a single light source 230 is shown, in embodiments the 3D printer 200 may include multiple light sources (e.g., two or more light sources), each of which may generate light beams that may be directed independently and which may operate in parallel to speed up the curing of the photo-curable material deposited onto the platform 205. When more than one light source is used, it may be different types of light sources, such as Laser, DLP of a different wavelength, etc.

In some embodiments, the light beam 235 is directed to the uppermost layer of the object 222 while the deposited photo-curable material at the uppermost layer is still hot (e.g., at around 90-120° C.). Alternatively, the uppermost layer of the object 222 may be allowed to cool before the light beam 235 is directed to the uppermost layer. In some embodiments, the deposited material will solidify quickly after being deposited. This allows the object to be built without the use of any support structures (or with minimal use of support structures) since the photo-cured portion 225 of the object 222 is encapsulated within and supported by the uncured portion 230, which may be frozen (e.g., solid) when it cools.

As shown, the light source 230 is mounted above the dispenser 215. However, the light source 230 may be below the dispenser 215 or coplanar with the dispenser 215 in embodiments. In an example, the light source 230 and the dispenser 215 may both be mounted to a mechanical stage.

In some embodiments, the 3D printer 200 further includes one or more heaters (not shown) that may maintain a temperature of the deposited material (e.g., object 222) at a level that is suitable for curing (e.g., photo-curing) of the material. The heater(s) may be mounted to the platform 205, to the bottom 260, to the sides 255, or elsewhere on the 3D printer 200 at one or more mixed positions. Alternatively, or additionally, one or more heaters may be mounted to the dispenser 215 (or to a mechanical stage to which the dispenser 215 may be mounted) to direct heat, for example, toward the output of the nozzle. Alternatively, or additionally, one or more heaters may be mounted to a guideway and may be independently movable to heat target portions of the object 222 to coincide with the light beam 235 being directed to the target portions. Accordingly, the heater may follow or precede the light beam 235 to control the local temperature of portions of the object 222 during the curing process. This may help to control warpage and/or shrinkage of the object 222 during curing, for example.

In some embodiments, one or more chillers may be included in the 3D printer 200 in addition to, or instead of, one or more heaters. The chiller(s) may be mounted, for example, to the platform 205 and/or elsewhere in the 3D printer 200. The chillers may include one or more conduits through which chilled fluid is flowed, for example.

In some embodiments, the 3D printer 200 further includes a heater (not shown) that may heat the interior volume 245 to a target temperature (e.g., about 60-130° C., or 90-120° C., or higher) that melts or liquefies the uncured portions 230 of the object 222 after the object has been completed. This may cause the high viscosity uncured material 230 to melt away and separate from the cured portion 225 of the object. Alternatively, once the object is complete, the object 222 may be removed from the 3D printer 200 and placed in an oven, which may heat the object 222 to the target temperature to melt the uncured portion 230 and separate the uncured portion 230 from the cured portion 225. Additionally or alternatively, the object may undergo solvent washing such as isopropanol and/or other solvents that are able to dissolve uncured material but not substantially affect cured material.

Figure 3A:
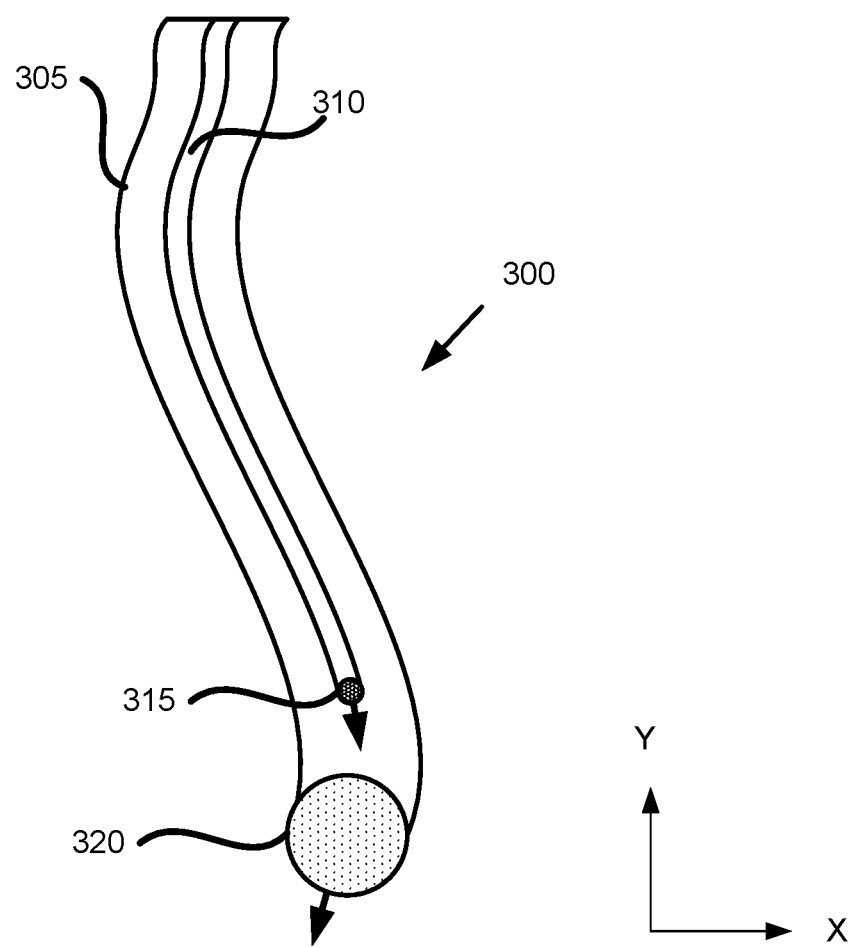
FIG. 3A illustrates a top-down view of a cross section of a printed layer that has been printed using a hybrid 3D printer, in accordance with some embodiments.

FIG. 3A illustrates a top-down view of a cross section of a printed layer 300 that has been printed using a hybrid 3D printer, in accordance with some embodiments. In some embodiments, the printed layer 300 is printed by hybrid 3D printer 200 of FIG. 2. As shown, the printed layer 300 includes an uncured portion 305 that has been deposited through a nozzle 320 having a particular diameter. The diameter of the nozzle 320 (and thus the minimum line width of the uncured portion 305 of the printed layer 300) may be about 250-800 microns in embodiments. In further embodiments, the diameter of the nozzle 320 (and thus the minimum line width of the uncured portion 305 of the printed layer 300) may be about 100-800 microns. The light beam 315 that is directed to the printed layer 300 may have a beam diameter of about 20-200 microns (e.g., about 100-200 microns) in embodiments. Accordingly, the cured portion 310 of the printed layer 300 may have a minimum diameter of about 20-200 microns (e.g., about 100-200) microns in embodiments. Since the minimum line width of the cured portion 310 may be much smaller than the minimum line width of the uncured portion 305, the level of detail that is attainable using the hybrid 3D printing technique described herein is much greater than the level of detail typically achievable using FDM. Additionally, the level of accuracy of the light beam 315 is generally much higher than the level of accuracy achievable by the dispenser. Accordingly, the hybrid 3D printing technique described herein also achieves a much greater level of accuracy than what is achievable using FDM.

Figure 3B:
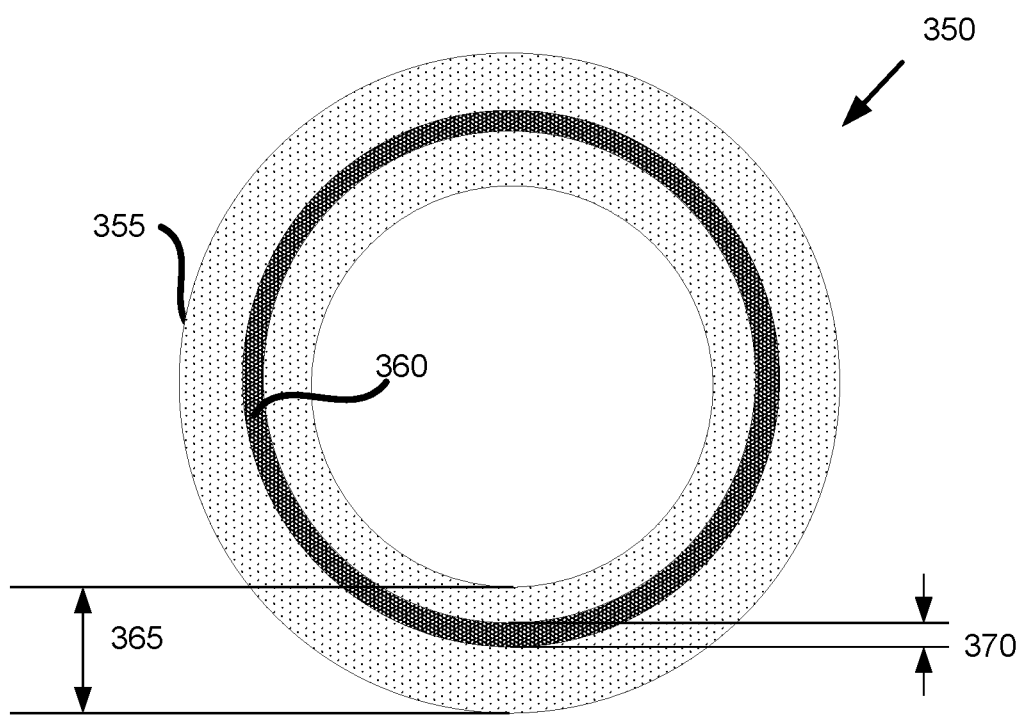
FIG. 3B illustrates another top-down view of a cross section of a printed layer that has been printed using a hybrid 3D printer, in accordance with some embodiments.

FIG. 3B illustrates another top-down view of a cross section of a printed layer 350 that has been printed using a hybrid 3D printer, in accordance with some embodiments. In some embodiments, the printed layer 350 is printed by hybrid 3D printer 200 of FIG. 2. As shown, the printed layer 350 includes an uncured portion 355 that has a first minimum line width 365 and a cured portion 360 that has a lower second minimum line width 370. The cured portion 360 of the printed object 350 may have been exposed to a light beam output by a laser and/or a light beam output by a DLP projector. In the case of the DLP projector, the minimum line width may correspond to a pixel size of the DLP projector.

Figure 4:
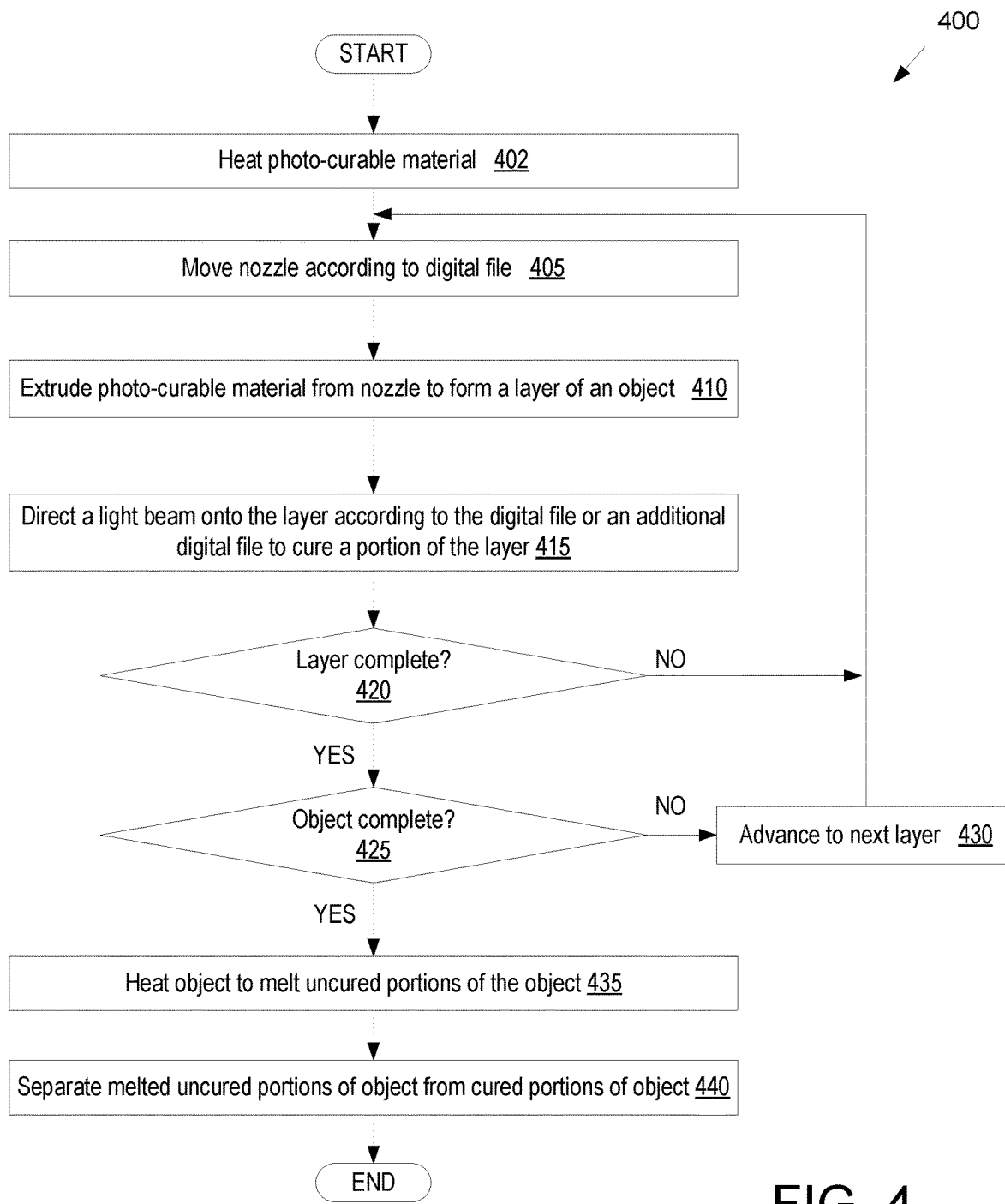
FIG. 4 illustrates a flow diagram for a method of performing 3D printing, in accordance with some embodiments.

FIG. 4 illustrates a flow diagram for a method 400 of performing 3D printing, in accordance with some embodiments. One or more operations of method 400 are performed by a hybrid 3D printer such as 3D printer 200 of FIG. 2 in accordance with instructions from a digital file. The instructions may be sent by processing logic of a computing device connected to the hybrid 3D printer. For example, computing device 500 of FIG. 5 may execute a CAM module 550 that processes a digital file 552 and provides instructions to the hybrid 3D printer based on the processing of the digital file 552. Alternatively, the instructions may be generated by a controller of the 3D printer based on a digital file.

At block 402 of method 400, a 3D printer heats a photo-curable material to a processing temperature. The processing temperature may be a temperature of above 60° C. in some embodiments. In a further embodiment, the processing temperature may be about 60-130° C. In a further embodiment, the processing temperature may be about 90-120° C. In other embodiments, the processing temperature is 20-30° C. In still other embodiments, the processing temperature is less than 20° C. or greater than 130° C.

At block 405, the 3D printer moves a nozzle (e.g., a dispenser that includes the nozzle) according to a digital file. The 3D printer may receive instructions from a CAM module executing on a computing device in some embodiments. In some embodiments, the digital file is loaded into a controller of the 3D printer, and the 3D printer determines a deposition sequence (e.g., a sequence of positions of the nozzle and/or of heights of a platform) to achieve a printed object. At block 410, the 3D printer extrudes the heated photo-curable material from the nozzle to form a layer of an object (a 3D printed part). The 3D printer may move the nozzle while the photo-curable material is extruded from the nozzle.

At block 415, the 3D printer directs a light beam onto the layer of the object according to the digital file or according to an additional digital file. For example, a first digital file may be used to determine where to extrude the one or more materials, and a second digital file may be used to determine where to direct the one or more light sources. Alternatively, the same digital file may be used to determine where to extrude the material and where to direct the light beam. In some embodiments, the light beam is directed to a portion of the layer that has been deposited while that portion of the layer is still heated (e.g., while the portion is still at or near the elevated processing temperature). Alternatively, or additionally, the light beam may be directed to the portion of the layer after the portion of the layer has cooled. The extruded photo-curable material may cool down rapidly after deposition, and may solidify in some embodiments. Accordingly, the uncured portions of the extruded material may encapsulate and support the cured portions of the material. Notably, the minimum line width of the cured portion of the object may be significantly thinner than the minimum line width of the uncured portion of the object.

At block 420, processing logic of the 3D printer (or of a computing device in communication with the 3D printer) may determine whether the current layer is complete. If the current layer is not complete, the method returns to block 405, the nozzle is moved (e.g., in the xy plane), and additional material is deposited at the layer. If the current layer is complete, the method continues to block 425.

The light beam used to cure a top layer of the printed object may have a sufficient power to penetrate below the top layer. For example, the light beam may penetrate to a depth of 2 or more layers. The cure depth may be greater than a layer thickness to ensure that touching layers are bonded together by the photopolymerization process. Accordingly, processing logic (e.g., of a controller of the 3D controller or of a computing device coupled to the 3D printer) may compensate for the cure depth to ensure that only portions of the object that are meant to be cured are in fact cured. For example, if a third layer is to be cured at a location, but a second layer below the third layer is not to be cured at the location, then the location may not be cured until the fourth layer has been deposited. Once the fourth layer is deposited at the location (e.g., xy coordinate), then the location may be cured, curing both the fourth layer and the third layer at the location, and leaving the first and second layers uncured at the location. Or, as mentioned previous, a grey scale light intensity can be used to control the depth of penetration into the layers.

At block 425, the processing logic of the 3D printer (or of a computing device in communication with the 3D printer) may determine whether the 3D printed object is complete. If the 3D printed object is not complete, the method proceeds to block 430, and the 3D printer moves the nozzle and/or a platform supporting the object in the z direction to advance to the next layer. The method then returns to block 405, and additional material is deposited to form the next layer. If the 3D printed object is complete at block 425, the method continues to block 435.

At block 435, the 3D printed object is heated (e.g., to the processing temperature or to another temperature that may be above the processing temperature). The heating of the printed object may cause the uncured portions of the printed object to melt and flow away from the cured portion of the printed object. Additionally, heating the printed object may further cure the cured portion of the printed object in some embodiments. At block 440, the uncured portions of the object may be separated from the cured portions of the object. This separation may occur merely by the heating of the object (at block 435), or by performing some additional process while the object is heated, such as rinsing with a heated fluid (e.g., by spraying a heated fluid at the object), by agitating the object, by spinning the object, and so on.

The printed object may have relatively low level (rough) details prior to separating the cured portion of the object from the uncured portion of the object due to the diameter of the nozzle used to deposit the photo-curable material and form the object. However, after separating the uncured portion from the cured portion, the resultant object may have high level (fine) details due to the small beam diameter of the light used to cure the cured portion of the object. Thus, the resultant 3D printed object may have a level of accuracy and detail that is on par with that of objects printed using SLA and DLP 3D printing techniques.

It is understood that multiple dispensing heads can be used and each may dispense one or more materials. Some of the dispensed materials may be standard FDM materials that do not require photo-curing or other curing mechanisms. It is also understood that while this hybrid printer is described using high viscosity resins and materials, it can also be used with low viscosity materials such as is standard for DLP and SLA printers. Also, it is understood that other curing mechanisms such as two part mixing of materials during dispensing is also possible (such as is possible with a static mixing head added to two (or more) dispensing heads) to create a mixed material that reacts either right away and/or later and/or with heating and/or with light.

Since the embodiments described herein are able to dispense multiple materials, some of those materials may comprise drugs such as hormones, analgesics, antimicrobial compounds, dyes, pH sensitive materials, pigments, gels, fragrances, flavors, catalysts, initiators, inhibitors, light blockers, UV blockers, etc. These materials may be dispensed on their own or mixed with resins or thermoplastics or solvents. Obviously, mixtures of materials are included.

It is also understood that the use of supports is sometimes needed or desired. With some embodiments, the ability to print an object with multiple materials also allows for making the supports out of a different material than the printed object. The support material may or may not be a photo-cured material. The support material may be designed to dissolve in solvents such as water or isopropyl alcohol or ethanol (or other solvents). It may be a wax material or other material that easily melts away during heating.

Various embodiments also provide the ability to incorporate pick and place technology into the printing method. For example, a robotic arm can pick up a self-contained electronic device (such as an electronic compliance indicator and place it into a specified layer of the print. Printing can continue and may fully encase the electronic device in cured material. Other objects can also be placed into any given layer of the print to fulfill other functions such as added structural support for the printed object or imbedded sensors.

In some embodiments, an optical sensing system is used to locate the surface of the layer to determine the exact height of the layer. This can facilitate control of the focal point of light used to cure the photo-curable material. It can also be used to spatially locate objects during print (such as objects that have been added via a robotic arm). It can also be used to verify that cure has occurred such as if the optical system uses fluorescence to determine the extent of cure. Other optical sensors can be incorporated into the printer such as FTIR, IR, NIR, Raman, to help determine the extent of cure or the location or amount of dispensed materials.

Method 400 may be performed to manufacture orthodontic aligners and other dental appliances to be worn over a patient's dental arches. The shape of each aligner is unique and customized for a particular patient and a particular treatment stage. Each aligner may be manufactured according to a unique digital file that corresponds to an aligner that will fit over an upper or lower dental arch of a particular patient at a particular treatment stage. Each aligner will apply forces to the patient's teeth at a particular stage of the orthodontic treatment. The aligners each have teeth-receiving cavities that receive and resiliently reposition the teeth in accordance with a particular treatment stage. Teeth may be repositioned by the aligners by, for example, moving one or more teeth vertically, rotating one or more teeth, moving one or more teeth in a transverse direction relative to the dental arch, and/or moving one or more teeth in an anterior-posterior direction relative to the dental arch. Each aligner may additionally include shapes that accommodate features attached to a patient's dentition that facilitate tooth repositioning and/or rotation.

Figure 5:
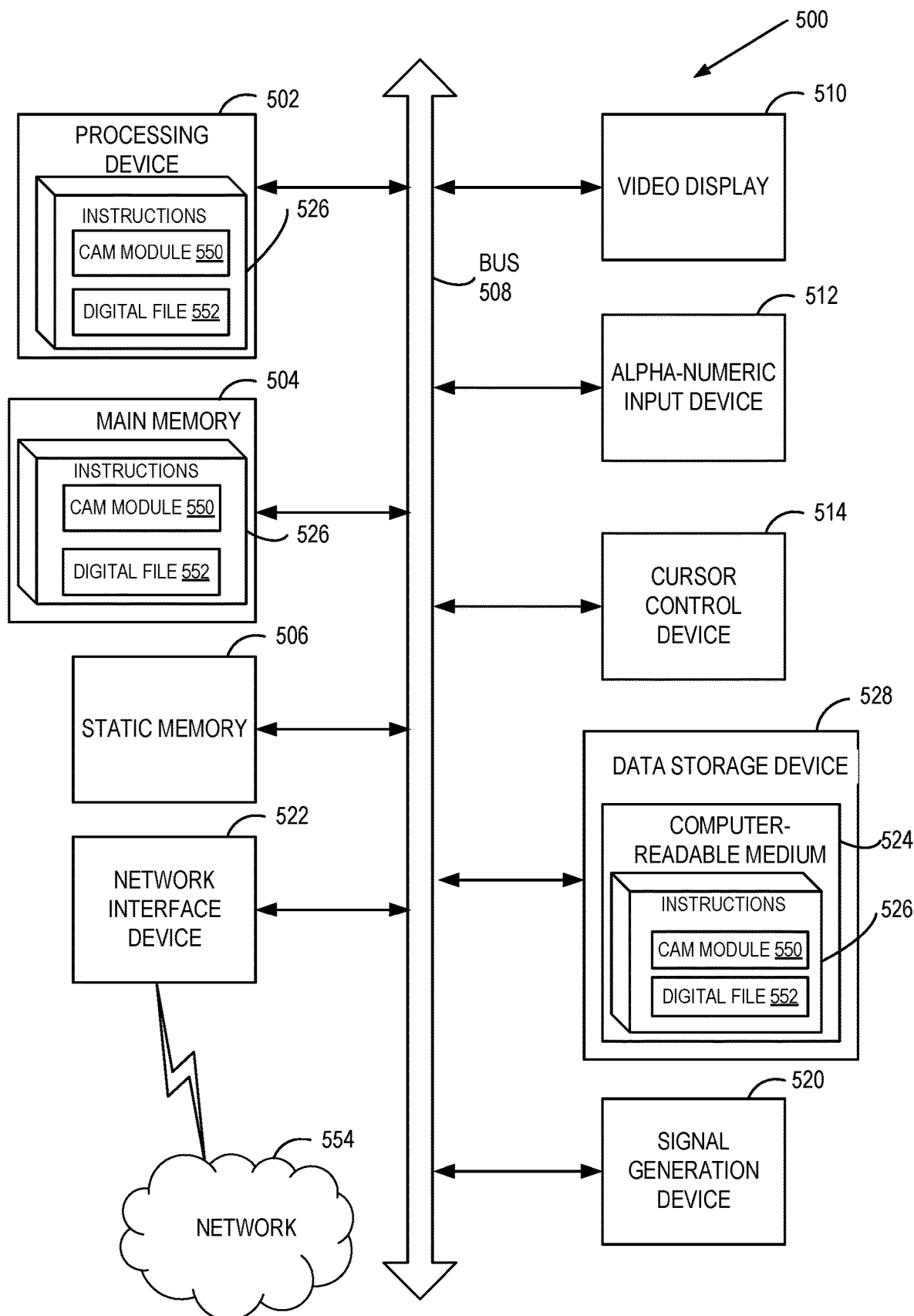
FIG. 5 illustrates a block diagram of an example computing device, in accordance with some embodiments.

FIG. 5 illustrates a diagrammatic representation of a machine in the example form of a computing device 500 within which a set of instructions, for causing the machine to perform any one or more of the methodologies discussed with reference to method 400. In alternative embodiments, the machine may be connected (e.g., networked) to other machines in a Local Area Network (LAN), an intranet, an extranet, or the Internet. For example, the machine may be networked to a rapid prototyping apparatus such as a 3D printer such as 3D printer 200 of FIG. 2. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 528), which communicate with each other via a bus 508.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 526) for performing operations and steps discussed herein.

The computing device 500 may further include a network interface device 522 for communicating with a network 564. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 528 may include a machine-readable storage medium (or more specifically a non-transitory computer-readable storage medium) 524 on which is stored one or more sets of instructions 526 embodying any one or more of the methodologies or functions described herein. A non-transitory storage medium refers to a storage medium other than a carrier wave or other propagating signal. The instructions 526 may also reside, completely or at least partially, within the main memory 504 and/or within the processing device 502 during execution thereof by the computer device 500, the main memory 504 and the processing device 502 also constituting computer-readable storage media.

The computer-readable storage medium 524 may also be used to store one or more virtual 3D models in the form of digital files 552 and/or a computer aided manufacturing (CAM) module 550. The CAM module 550 may process the digital file 552 to determine the sequence of positions of a dispenser (e.g., an extruder) and/or a platform that will result in 3D printed object defined by the digital file 552. The CAM module 550 may send instructions to a 3D printer to cause the 3D printer to perform one or more of the operations of method 400. While the computer-readable storage medium 524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments have been described with reference to specific examples, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Example experiments were performed, as set forth below.

In a first example, material A, material B, and material C were placed into 1 mL syringes with a 22 gauge flat top needle. Material A was a hot melt adhesive. Material B was TCDDA with 1 wt % TPO-L. Material C was t-butyl acrylate with 1 wt % TPO-L. In the experiment, material A was extruded onto a glass slide in the form of a circle. Material B was then dispensed to fill the inside of the circle. A dog bone pattern was projected onto the liquid inside the circle, creating a dog bone print to form. The print was fully inside the outer circle. Then material A was dispensed on top of the previous circle to increase the height of the vat and then cured. Then material C was dispensed into the circle to fill the reservoir with material C. The dog bone pattern was exposed onto the liquid resin in the same location as the previous projection. The material C cured in the shape of the dog bone. The process was repeated 4 more times to form a material with 5 layers of material B and 5 layers of material C in alternating layers in the shape of the dog bone. The composite nature of the dog bone was confirmed using FTIR and Raman spectroscopy to identify each layer of the composite.

In another experiment, the vat was formed layer by layer as demonstrated before, but materials B and C were dispensed side by side in each layer such that when the exposure was made, the left half of the dog bone was material B and the right half of the dog bone was material C. The interface between the two materials underwent some mixing before the exposure occurred and so the interface represents a new material which is a mixture of materials B & C.

What is claimed is:

1. A method of three-dimensionally (3D) printing an orthodontic aligner, comprising:
   extruding one or more photo-curable materials from a nozzle to form a first layer of the one or more extruded photo-curable materials according to one or more digital files, wherein the first layer of the one or more extruded photo-curable materials has a first shape specified by the one or more digital files, wherein the first shape of the one or more extruded photo-curable materials corresponds to a first minimum line width that is based on, and narrower than, a diameter of the nozzle; and
   directing a light beam onto the first layer of the one or more extruded photo-curable materials according to the one or more digital files to cure a portion of the first layer of the one or more extruded photo-curable materials to create a first cured layer of the one or more photo-curable materials, wherein the first cured layer of the one or more photo-curable materials corresponds to a second shape of a first layer of a 3D printed orthodontic aligner specified by the one or more digital files, wherein the light beam has a beam diameter that is smaller than the diameter of the nozzle, and wherein the second shape has a second minimum line width that is smaller than the first minimum line width.

2. The method of claim 1, further comprising:
   extruding the one or more photo-curable materials from the nozzle to form a second layer of the one or more extruded photo-curable materials over the first layer of the one or more extruded photo-curable materials according to the one or more digital files, wherein the second layer of the one or more extruded photo-curable materials has a third shape specified by the one or more digital files; and
   directing the light beam onto the second layer of the one or more extruded photo-curable materials according to the one or more digital files to cure a portion of the second layer of the one or more extruded photo-curable materials to create a second cured layer of the one or more photo-curable materials, wherein the second cured layer of the one or more photo-curable materials corresponds to a fourth shape of a second layer of the 3D printed orthodontic aligner, wherein the light beam penetrates the second layer of the one or more extruded photo-curable materials and at least a portion of the first layer of the one or more extruded photo-curable materials to bond the second cured layer of the one or more photo-curable materials to the first cured layer of the one or more photo-curable materials.

3. The method of claim 1, wherein the light beam cures the portion of the first layer before an entirety of the first shape of the first layer is formed, and wherein the one or more photo-curable materials are bioinert and biocompatible after being cured.

4. The method of claim 1, wherein the first layer of the one or more extruded photo-curable materials is an intermediate layer of the one or more extruded photo-curable materials, the method further comprising:
   heating the first layer of the one or more extruded photo-curable materials; and
   removing uncured portions of the first layer of the one or more extruded photo-curable materials to separate the uncured portions of the first layer from the first cured layer.

5. The method of claim 1, further comprising:
   repositioning at least one of the nozzle or a supporting platform while extruding the one or more photo-curable materials to form the first shape; and
   repositioning at least one of the light beam or the supporting platform after a portion of the first layer has been extruded to form the second shape within the first shape.

6. The method of claim 1, wherein the light beam is an ultraviolet (UV) light beam, the method further comprising:
   generating the light beam using at least one of a UV laser or a UV digital light processing (DLP) projector.

7. The method of claim 1, wherein at least one photo-curable material of the one or more photo-curable materials comprises long chain monomers, has a first viscosity of less than 2 Pascal-seconds (Pa-s) while it is heated to a temperature of about 60-130 degrees Celsius (° C.) and a second viscosity of greater than 10 Pa-s at room temperature.

8. The method of claim 1, wherein the first minimum line width is about 100-800 microns and the second minimum line width is about 20-200 microns.

9. The method of claim 1, wherein the 3D printed orthodontic aligner comprises at least one of a tensile modulus of about 800-1000 MPa, a tensile strength of about 25-40 MPa, or an elongation at break of about 20-30% at a temperature of about 37 +/−2° C.

10. The method of claim 1, wherein the light beam is directed onto the portion of the first layer of the one or more extruded photo-curable materials to cure the portion of the first layer of one or more extruded photo-curable materials before the portion of the first layer of one or more extruded photo-curable materials has cooled.

11. The method of claim 1, wherein the light beam follows a same path as the nozzle.

12. The method of claim 1, wherein the light beam is directed onto the portion of the first layer of the one or more extruded photo-curable materials while the nozzle continues to extrude the one or more photo-curable materials to form a remainder of the first layer of the one or more extruded photo-curable materials.

13. The method of claim 1, whereon the one or more photo-curable materials comprise a first photo-curable material and a second photo-curable material, wherein extruded first photo-curable material has a first line width that is different from a second line width of extruded second photo-curable material.

14. The method of claim 1, whereon the one or more photo-curable materials comprise a first photo-curable material and a second photo-curable material that are extruded from the nozzle at a same time.

15. The method of claim 14, wherein the extruded first photo-curable material has a first line width that is less than a second line width of extruded second photo-curable material.

16. The method of claim 14, wherein the extruded first photo-curable material has a first line width, wherein the second photo-curable material has a second line width, and wherein at least one of the first line width or the second line width is less than the diameter of the nozzle.

17. The method of claim 1, further comprising:
   applying one or more stimuli to cause the one or more photo-curable materials to have one or more rheological properties.

18. The method of claim 17, wherein applying the one or more stimuli comprises at least one of heating the one or more photo-curable materials or introducing a reactive diluent to the one or more photo-curable materials.

* * * * *